(12) United States Patent
Stillwell et al.

(10) Patent No.: US 9,126,226 B2
(45) Date of Patent: Sep. 8, 2015

(54) APPLICATOR DEVICE FOR PLASTIC MOULDING MACHINE

(75) Inventors: Nicholas Stillwell, Wingfield Trowbridge (GB); Alfred Rodlsberger, Piesendorf (AT)

(73) Assignee: UPCYCLE HOLDINGS LIMITED (IE)

( * ) Notice: Subject to any disclaimer, the term of this patent is extended or adjusted under 35 U.S.C. 154(b) by 306 days.

(21) Appl. No.: 13/809,033

(22) PCT Filed: Jul. 13, 2011

(86) PCT No.: PCT/GB2011/001054
§ 371 (c)(1),
(2), (4) Date: Mar. 19, 2013

(87) PCT Pub. No.: WO2012/007717
PCT Pub. Date: Jan. 19, 2012

(65) Prior Publication Data
US 2013/0216703 A1     Aug. 22, 2013

(30) Foreign Application Priority Data
Jul. 14, 2010   (GB) .................................. 1011863.6

(51) Int. Cl.
*B05C 19/00*      (2006.01)
*B29C 31/04*      (2006.01)
(Continued)

(52) U.S. Cl.
CPC .............. *B05C 19/00* (2013.01); *B29C 31/044* (2013.01); *B29C 43/34* (2013.01); *B29C 31/02* (2013.01);
(Continued)

(58) Field of Classification Search
CPC ............ B29C 67/0085; B29C 37/0007; B29C 31/044; B29C 31/045; B29C 43/34; B29C 2043/3488; B29C 2043/3438; B29C 2043/3427; B05C 19/00
See application file for complete search history.

(56) References Cited

U.S. PATENT DOCUMENTS 2,281,050 A  *  4/1942  Redshaw ...................... 414/166
2,692,142 A  *  10/1954  Hunter .......................... 222/164
(Continued)

FOREIGN PATENT DOCUMENTS

BE         1007594 A3       8/1995
EP         0012589 A1       6/1980
(Continued)

OTHER PUBLICATIONS
PCT International Search Report, PCT/GB2011/001054 and Written Opinion of the ISA; date of completion of the International Search Nov. 30, 2011; date of mailing Dec. 9, 2011; 10 pages.
(Continued)

*Primary Examiner* — Yogendra Gupta
*Assistant Examiner* — Emmanuel S Luk
(74) *Attorney, Agent, or Firm* — Luedeka Neely Group, PC

(57) ABSTRACT

A device (10) for applying particulate material onto a surface of a mould is described. The device (10) comprises a container (12) for holding particulate material and defining an opening (18) for releasing the material. A closure device (20) is operable to open and close the opening (18). A levelling means (24) projects from the container (12) adjacent to the opening (18) and is operable to level the surface of the material dispensed. The levelling means (24) is shorter than the length of the opening (18) so that the opening extends beyond each end of the levelling means (24). In this way, an even layer of particulate material can be dispensed in one pass covering the bass of a mould cavity and opposed side walls of the cavity.

11 Claims, 2 Drawing Sheets

(51) Int. Cl.
  *B29C 43/34* (2006.01)
  *B29C 31/02* (2006.01)

(52) U.S. Cl.
  CPC ....... *B29C 31/045* (2013.01); *B29C 2043/3427* (2013.01); *B29C 2043/3438* (2013.01); *B29C 2043/3488* (2013.01)

(56) References Cited

U.S. PATENT DOCUMENTS

| | | | |
|---|---|---|---|
| 3,780,889 A * | 12/1973 | Frazier et al. | 414/166 |
| 4,011,036 A * | 3/1977 | Bichet | 425/217 |
| 4,053,088 A * | 10/1977 | Grataloup | 222/312 |
| 4,056,423 A * | 11/1977 | Hughes | 156/356 |
| 4,106,535 A * | 8/1978 | Davis | 141/88 |
| 4,226,564 A * | 10/1980 | Takahashi et al. | 414/166 |
| 4,239,715 A * | 12/1980 | Pratt | 264/70 |
| 4,246,335 A * | 1/1981 | Keogh et al. | 264/177.16 |
| 4,323,178 A * | 4/1982 | Longinotti | 222/415 |
| 4,383,759 A * | 5/1983 | Bloothoofd et al. | 355/85 |
| 4,403,566 A * | 9/1983 | Bloothoofd | 118/407 |
| 4,491,559 A * | 1/1985 | Grab et al. | 419/36 |
| 4,545,446 A * | 10/1985 | Kokabu | 177/108 |
| 4,545,717 A * | 10/1985 | Wittler et al. | 414/166 |
| 4,638,758 A * | 1/1987 | Bloothoofd | 118/412 |
| 4,793,787 A * | 12/1988 | Schermutzki | 425/140 |
| 5,199,612 A * | 4/1993 | Raque | 222/134 |
| 5,348,605 A * | 9/1994 | Hughes et al. | 156/275.5 |
| 5,637,175 A * | 6/1997 | Feygin et al. | 156/264 |
| 5,647,931 A | 7/1997 | Retallick et al. | |
| 5,934,343 A * | 8/1999 | Gaylo et al. | 141/12 |
| 6,094,994 A * | 8/2000 | Satake et al. | 73/861.73 |
| 6,264,462 B1 * | 7/2001 | Gallagher | 425/574 |
| 6,589,038 B1 * | 7/2003 | Robinson et al. | 425/145 |
| 6,672,343 B1 | 1/2004 | Perret et al. | |
| 6,764,636 B1 * | 7/2004 | Allanic et al. | 264/401 |
| 7,690,909 B2 * | 4/2010 | Wahlstrom | 425/375 |
| 7,748,971 B2 * | 7/2010 | Hochsmann et al. | 425/90 |
| 8,119,053 B1 * | 2/2012 | Bedal et al. | 264/308 |
| 2002/0182283 A1 * | 12/2002 | Gallagher | 425/375 |
| 2006/0105102 A1 | 5/2006 | Hochsmann et al. | |
| 2008/0241295 A1 * | 10/2008 | Dubey | 425/111 |

FOREIGN PATENT DOCUMENTS

| | | |
|---|---|---|
| GB | 781983 | 8/1957 |
| GB | 1465155 | 2/1977 |
| JP | 8085121 | 4/1996 |

OTHER PUBLICATIONS

Intellectual Property Office, Application No. GB1011863.6, Patents Act 1977: Search Report under Section 17, date of search Oct. 25, 2010; 2 pages.

International Preliminary Report on Patentability, International Application PCT/GB2011/001054, dated Jan. 15, 2013, date of mailing Jan. 24, 2013, 8 pages.

\* cited by examiner

APPLICATOR DEVICE FOR PLASTIC MOULDING MACHINE

CROSS-REFERENCE TO RELATED APPLICATION

This application claims priority under all applicable statutes, and is a U.S. National phase (37 USC Section 371) of International Application PCT/GB2011/001054, filed 13 Jul. 2011, and entitled APPLICATOR DEVICE FOR PLASTIC MOULDING MACHINE, which claims priority to GB 1011863.6, filed 14 Jul. 2010, incorporated herein by reference in their entireties The present invention is in the field of plastic moulding machines. In particular, it relates to an applicator device for dispensing plastic particulate material into or onto a mould and a plastic moulding machine incorporating such an applicator device.

GB 2460838 describes a process for moulding plastic articles in which a particulate material is placed in two heated female moulds and is melted to form a skin in each mould. A filler material is placed in one mould and the two moulds are brought together to form a closed mould cavity in which the two skins fuse together, encasing the filler material. In at least one of the moulds, the skin is created by first placing a former in the mould which is slightly smaller than the mould cavity and filling the gap between the former and the cavity walls with particulate material to form a skin around the side walls of the mould cavity. The former is then removed and a layer of particulate material is placed in the bottom of the mould cavity to form a skin over the base of the mould which joins with the skin around the side walls. However, such a procedure is complicated, cumbersome and slow. The present invention addresses problems and limitations of the related prior art.

The present invention provides a device for applying particulate material on to a surface of a mould, comprising a container for holding a quantity of particulate material and defining an opening for releasing particulate material from the container, a closure device operable to open and close the opening, and a levelling means projecting from the container adjacent to the opening and operable to level the surface of a quantity of particulate material applied on to the surface of the mould, wherein the levelling means comprises a planar member with a length which is less than the length of the opening such that the opening extends beyond each end of the levelling means.

The device of the present invention allows a controlled, even layer of material to be applied to a mould surface in an efficient manner, and in a single step, eliminating the use of a former. The design also allows material to be pushed to the sides of the mould to coat side walls thereof at the same time as coating the base of the mould, thus coating the entire mould surface in a single step process.

Preferably the opening comprises an elongate slot and the closure device comprises a planar member slidable across the opening.

The device preferably further comprises first locking means to lock the closure device at a plurality of different positions across the opening.

In this way, the amount of material dispensed can be controlled, and the device adjusted to suit the type and particulate size of the material being used.

In a preferred embodiment, the device further comprises guide means engageable with a mould and operable to locate the device on the mould and to allow movement of the device across the moulding surface.

The guide means may comprise one of a recess or a projection engageable with a corresponding projection or recess respectively on the mould.

Preferably the device further comprises drive means to move the device across the surface of the mould.

These features improve control of the device and simplify the application procedure.

The container preferably defines an internal volume which tapers in a direction towards the opening.

This helps to ensure a smooth flow of material towards and through the opening.

The levelling means typically comprises a leading edge, which is movably mounted on the container adjacent to the opening so that the leading edge is movable towards and away from the opening.

The levelling means preferably further comprises second locking means to lock the planar member with the leading edge at a plurality of different positions relative to the opening.

In this way, as the device moves across the mould surface, the material is smoothed and levelled, leaving a desired thickness of material applied to the surface.

The present invention also provides a plastic moulding machine comprising at least one mould having a mould cavity, in combination with a device for applying particulate material on to the moulding surface as set out above.

Conveniently, the device for applying particulate material is removably mounted on the machine.

The present invention also provides a method of applying particulate material on to a surface of a mould cavity defining a base and side walls, comprising positioning a device as set out above over a mould cavity, closing the opening with the closure device, filling the container with particulate material, moving the levelling means to project from the container to a desired amount, moving the closure device to open the opening, moving the device across the mould to apply particulate material through the opening simultaneously on to the base and two opposed side walls of the mould and to level the surface of the applied particulate material.

The invention will now be described in detail, by way of example only, with reference to the accompanying drawings in which.

Figure 1:
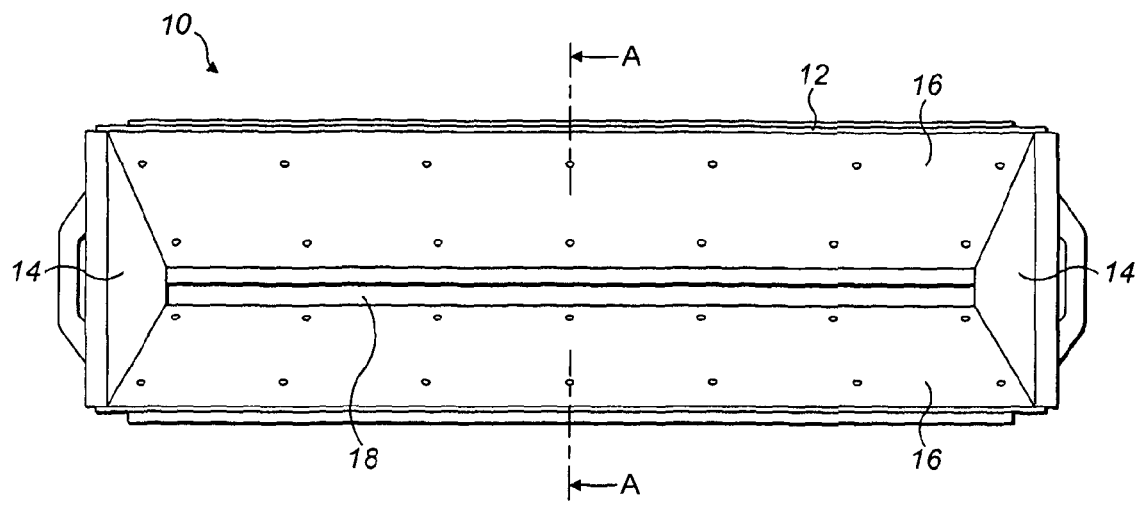
FIG. 1 is a plan view of part of the applicator device in accordance with one embodiment of the present invention.

An applicator device 10 in accordance with one embodiment of the present invention comprises a hopper 12 containing particulate material which is to be dispensed into a mould. The hopper 12 is a hollow rectangular box in plan view, open at the top and the bottom. The end walls 14 are substantially parallel to one another. The opposing side walls 16 converge from top to bottom to form an elongate dispensing slot 18 at the bottom of the device 10. Thus, the hopper 12 defines an internal volume which tapers in a direction towards the slot 18.

Figure 2:
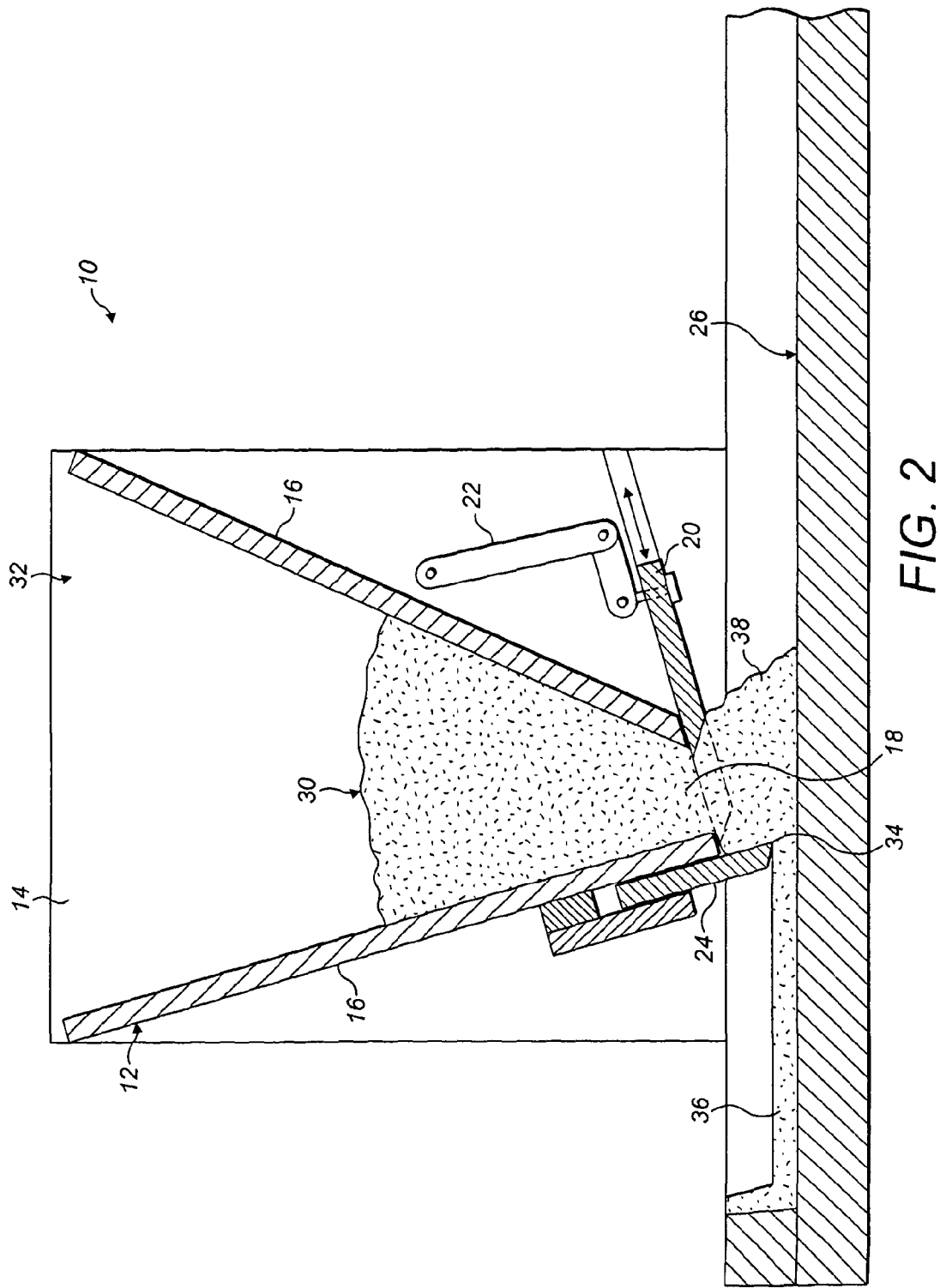
FIG. 2 is a cross section of the applicator of FIG. 1 along the line AA and shown in use with a mould.

The slot 18 is closable by a sliding door 20 which can move back and forth in the direction of arrow X in order to close it altogether or to open it to different widths. The door 20 is adjustable by a pivoting linkage mechanism 22 as best seen in FIG. 2, but any convenient mechanism could be used. The mechanism 22 preferably also includes locking means of any convenient form to lock the door 20 in the desired position. For example, a friction brake may be used.

An adjustment bar 24 is slidably secured to one side wall 16 of the hopper 12, on the opposite side of the slot 18 to the door 20. The bar 24 has a leading edge 34. The bar 24 slides parallel with the adjacent side wall 16 so that it can extend beneath the hopper 12 by varying amounts. It can be locked in different positions as discussed further below. For example, a friction brake may be used.

Figure 3:
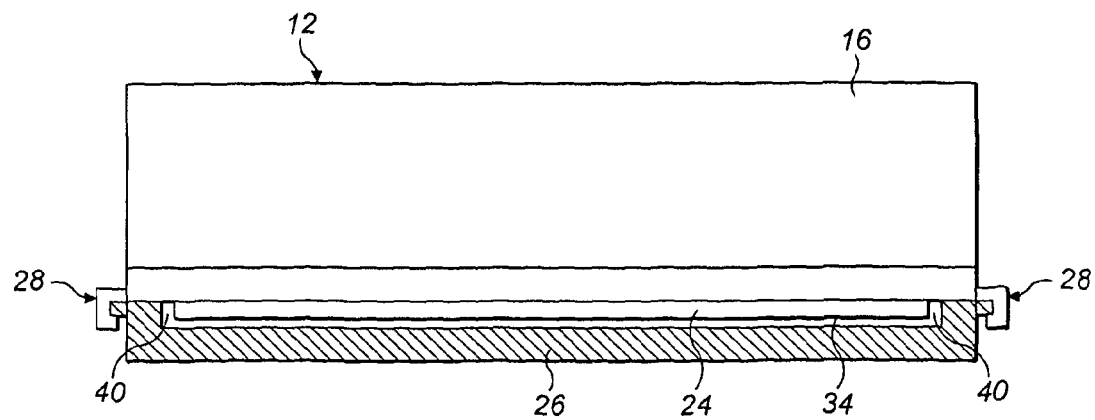
FIG. 3 is a rear view of the applicator device of FIG. 1, also in use with a mould which is shown in section.

In use, the applicator device 10 is placed over a mould 26. Preferably, the device 10 and the mould 26 are provided with a cooperating parts of a guide rail arrangement 28 on either side so that the device 10 can be located accurately in position over the mould 26 and is able to traverse across it. The guide rail arrangement 28 is illustrated schematically in FIG. 3, with a part of the device 10 defining a recess which slidably receives a projecting rail or track on the mould. However, this could be reversed, with a projection on the device 10 sliding in a recess in the mould, and any other convenient form may also be employed.

The door 20 is closed and particulate material 30, either in powder or granular form, is placed in the hopper 12 through the open top 32. The door 20 is then opened to a desired degree to open slot 18 to a predetermined width. This will depend on the type and particle size of the particulate material 30 and the desired quantity to be dispensed etc. The particulate material 30 exits through the slot 18 under gravity. The rate at which it is dispensed depends upon the width of the slot 18 as controlled by the position of the door 20.

The adjustment bar 24 is moved so that its leading edge 34 extends to a desired distance beneath the dispensing slot 18 and above the bottom surface of the mould cavity.

Particulate material is initially dispensed from the slot 18 against the first wall of the mould (on the left hand side as in FIG. 2). The device 10 is then advanced from one side of the mould 26 towards the other as shown by arrow Y. As the hopper 12 traverses the mould 26, the leading edge 34 of the adjustment bar 24 comes into play and scrapes across the dispensed particulate material to create a smooth layer 36 of controlled depth in the base of the mould cavity. The excess 38 of the particulate material 30 is pushed in front of the adjustment bar 24 as the device 10 moves across the mould 26. In this way, an even layer of particulate material 30 is deposited across the entire bottom surface of the mould 26.

The length of the adjustment bar 24 is slightly less than the length of the slot 18 and the width of the mould 26. The bar 24 is positioned such that a gap 40 is left between each end of the adjustment bar 24 and the adjacent side wall of the mould 26. Therefore, as the hopper 12 traverses the mould 26 and the adjustment bar 24 pushes the excess 38 of the particulate material 30 before it, some particulate material 30 is also pushed to the side and fills the gap 40 between each end of the bar 24 and the side walls of the mould 26. Thus, the side walls of the mould 26 are also coated with a layer of particulate material 30.

At the end of the traverse, the adjustment bar 24 acts to push a layer of particulate material 30 against the end wall of the mould cavity. Thus, an even layer of particulate material 30 is deposited across the bottom of the mould 26 and against each side wall of the mould 26. When the mould 26 is then heated to melt and fuse the particulate material 30, a unitary skin lining the entire mould 26 is formed in a single step.

The device 10 may be moved across the mould 26 simply by hand, or an automated drive means (not shown) may be provided to move it at a controlled speed.

The device 10 may be permanently secured to a mould, in which case the rail arrangement 28 will extend sufficiently far to allow the device 10 to move clear of the mould cavity and so to allow another mould to be brought into engagement with the first mould. Alternatively, the device 10 may be removably fitted to a mould.

Thus, the present invention provides an applicator device, an improved plastic moulding machine, and a method of applying material on to a mould surface which allow an even layer of particulate material to be deposited on a mould surface. Moreover, when used with a female mould, the base and side walls of the mould cavity are coated in a single stage process. This greatly improves the efficiency of the process and the quality of the resulting skin and moulded article. The invention is particularly useful for open mould processes, to create a skin in the mould in a single step.

The skilled person will appreciate that various alterations and modifications to the precise details described herein can be made without departing from the scope of the claims.

The invention claimed is:

1. A device for applying particulate material on to a surface of a mould, comprising a container positionable relative to the mold for holding a quantity of particulate material and defining an opening having a length for releasing particulate material from the container, a closure device operable to open and close the opening, and a levelling member having opposite ends and projecting from the container and adjustably positionable adjacent to the opening and operable to level the surface of a quantity of particulate material applied on to a surface of the mould, the levelling member having a length which is less than the length of the opening such that the opening extends beyond each end of the levelling member.

2. A device as claimed in claim 1, wherein the opening comprises an elongate slot and the closure device comprises a planar member slidable across the opening.

3. A device as claimed in claim 1, further comprising a first lock operably associated with the closure device to lock the closure device at a plurality of different positions across the opening.

4. A device as claimed in claim 1, further comprising a guide engageable with a mould and operable to locate the device for applying particulate material on the mould and to allow movement of the device for applying particulate material across the moulding surface.

5. A device as claimed in claim 4, wherein the guide comprises one of a recess or a projection engageable with a corresponding projection or recess respectively on the mould.

6. A device as claimed in claim 1, wherein the container defines an internal volume which tapers in a direction towards the opening.

7. A device as claimed in claim 1, wherein the levelling member includes a leading edge, and the levelling member is movably mounted on the container adjacent to the opening so that the leading edge of the levelling member is movable towards and away from the opening.

8. A device as claimed in claim 7, wherein the levelling member further comprises second lock located and operable to lock the planar member with the leading edge at a plurality of different positions relative to the opening.

9. A plastic moulding machine comprising at least one mould having a mould cavity; and a device located on the machine for applying particulate material to the mould cavity, the device comprising a container positionable relative to the mold cavity for holding a quantity of particulate material and defining an opening having a length for releasing particulate material from the container, a closure device operable to open and close the opening, and a levelling member having opposite ends and projecting from the container and adjustably positionable adjacent to the opening and operable to level the surface of a quantity of particulate material applied on the mould cavity, the levelling member having a length which is less than the length of the opening such that the opening extends beyond each end of the levelling member.

10. A plastic moulding machine as claimed in claim 9, wherein the device for applying particulate material is removably mounted on the machine.

11. A method of applying particulate material on to a surface of a mould cavity defining a base and side walls, comprising positioning a particulate application device over the mould cavity, the particulate application device comprising a container positionable relative to the mold cavity for holding a quantity of particulate material and defining an opening having a length for releasing particulate material from the container, a closure device operable to open and close the opening, and a levelling member having opposite ends and projecting from the container and adjustably positionable adjacent to the opening and operable to level the surface of a quantity of particulate material applied on the mould cavity, the levelling member having a length which is less than the length of the opening such that the opening extends beyond each end of the levelling member, closing the opening with the closure device, filling the container with particulate material, moving the levelling member to project from the container to a desired amount, moving the closure device to open the opening, moving the particulate application device across the mould to apply particulate material through the opening simultaneously on to the base and two opposed side walls of the mould and to level the surface of the applied particulate material.

\* \* \* \* \*